Figure 3:
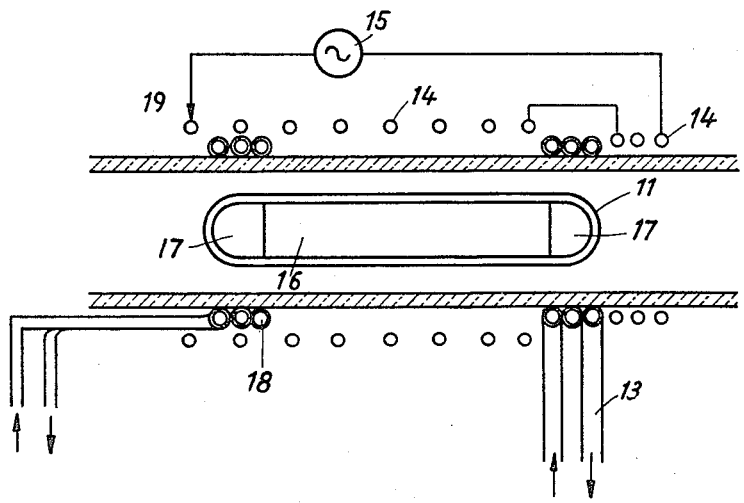

July 30, 1957 S. L. ÖVERBY 2,801,192
PURIFICATION PROCESS FOR REMOVING SOLUBLE
IMPURITIES FROM FUSIBLE SOLID
SUBSTANCES
Filed April 15, 1954 2 Sheets-Sheet 1
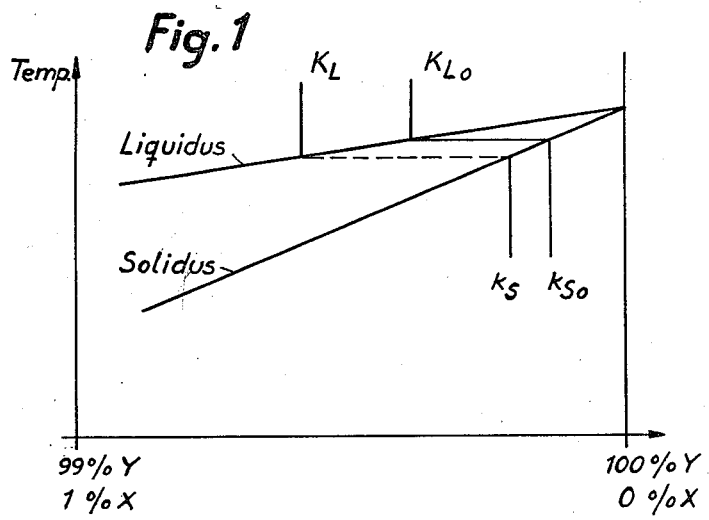
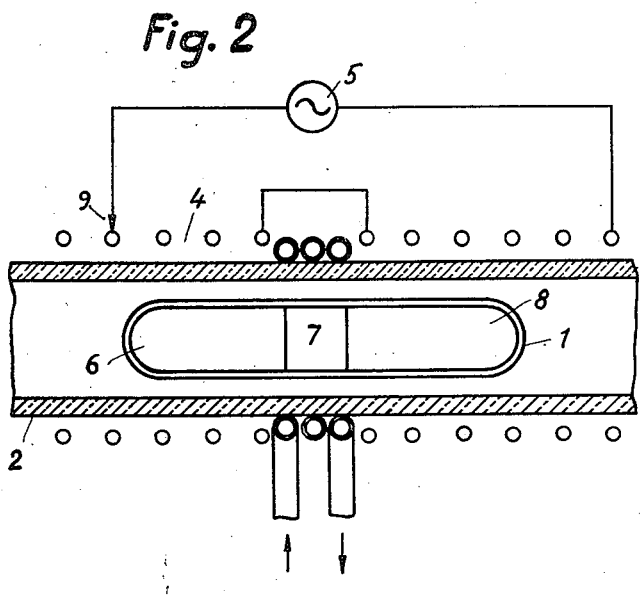
INVENTOR
SUNE LAMBERT ÖVERBY
By Fredrich E. Hans
ATTORNEY United States Patent Office 2,801,192
Patented July 30, 1957

2,801,192

PURIFICATION PROCESS FOR REMOVING SOLUBLE IMPURITIES FROM FUSIBLE SOLID SUBSTANCES

Sune Lambert Överby, Stockholm, Sweden, assignor to Telefonaktiebolaget L M Ericsson, Stockholm, Sweden, a corporation of Sweden Application April 15, 1954, Serial No. 423,469

Claims priority, application Sweden April 20, 1953

4 Claims. (Cl. 148—1)

The present invention relates to a process for removing soluble impurities from a solid substance.

In several applications of solid substances, such as metals, intermetallic and chemical compounds, it occurs, that very high requirements are set upon the purity of the substance. The requirements may reach such extreme degrees, amounting even to figures of one in one million or better as to residuals in for example electrical semi-conductors, that normal chemical procedures fail. Still lower impurity contents may, however, be attained by special chemical means or by physical means, the latter having recently attained important technical applications due to the simplicity of a purifying process, generally called zone melting.

This process relies upon the fundamental physical property that soluble impurities in a fusible substance tend to stay in the liquid phase, when the substance is partially melted to give a direct contact between solid and liquid phase. In performing the zone melting a straight bar or a toroid shaped ring of the substance is subjected to local heating, causing a short molten cross zone in the solid. The zone is moved along the bar either by displacement of the heating source or by means of moving the bar relative to the heater. The zone melting is described by for example W. G. Pfann, "Principles of zone melting," Journal of Metals, 1952, July, p. 747–753 ( = Bell Laboratories Monograph No. 2000) and by the same author "Segregation of two solutes, with particular reference to semi-conductors," Journal of Metals, 1952, Aug., p. 861–865 ( = Bell Laboratories Monograph No. 2020).

The physical background for the zone melting may be pictured by reference to corresponding phase diagram of the different impurities contained in the basic substance. In particular, that part of the diagram is important which lies closely to the one 100 percent corner of the basic substance. At this point it is convenient also to refer to the distribution coefficient $k$, defined as the ratio of the concentration of the impurities in the solid to the concentration of the impurities in the liquid, when speaking of a simple binary two-phase diagram. The zone melting process works very well for values of $k$ less than 1.0, which is the case most often encountered in metals.

According to the present invention an elongated melt of the substance to be purified is subjected to a local cooling thereby forming a limited solid core adjoining the molten region of the substance, said core being displaced in the melt, and the process is terminated by cooling the whole melt, starting at the end opposite to the solid core.

The invention will be closer described in conjunction with the accompanying drawing, of which Fig. 1 shows a phase diagram Fig. 2 shows a set up for realizing the process according to the invention Fig. 3 shows another set up for realizing the process according to the invention.

Fig. 1 illustrates a typical phase diagram around the one 100 percent corner for a simple binary alloy of components $x$ and $y$ with $k$ less than 1.0. It may picture the conditions for example with germanium as $y$-substance and antimony as $x$-substance, when the latter is the impurity component. If the melt has the impurity concentration $k_{L_0}$ of substance $x$ Fig. 1, and is cooled along the vertical line $k_{L_0}$, the cooling progresses until $k_{L_0}$ meets the liquidus curve. From then on the process follows the horizontal line to the intersection with the solidus line and finally along the vertical line $k_{S_0}$. This picture applies for the moment to a limited region of the liquid solid interface. The ratio of the two horizontal distances, measured from the 100-percent-$y$ vertical line to the intersection of the solidus and the liquidus line respectively equals the distribution coefficient $k$. As long as a horizontal line starting from the 100% $y$ line in the phase diagram, Fig. 1, has its intersection point with the liquidus curve to the left of its intersection with the solidus curve, the impurities tend to stay in the liquid phase. This is just another way of stating that $k$ is less than 1.0.

The zone melting process can be applied to remove for example antimony traces from germanium. However, the zone melting process performs no purification from impurity components having $k$ larger than 1.0. A notable example of this is silicon traces in germanium. The phase diagram of silicon/germanium has been studied by H. Stohr and W. Klemm in "Binäre Systeme mi Ge, GeAl, GeSn und GeSi," Zs Anorg. Chemie, 1939, vol. 241, p. 305. When $k$ exceeds 1.0, the result of the zone melting process is, that the liquid part becomes starved of impurities, which instead will be concentrated in the solid phase. When impurities having a $k$ value above and below respectively of 1.0 are contained in a bar of a substance subjected to zone melting, the final result of a straight-run repeated zone melting is a separation of the two basic kinds of impurities. The one part with $k$ less than 1.0 is concentrated to the end of the bar, while the other part with $k$ exceeding 1.0 is dispersed in the remainder of the bar and no real purification is achieved.

It is the aim of this invention to disclose a convenient process for the purification from the impurities having $k$ above 1.0. This is realized by reversed zone melting, a process called zone cooling.

In the description above it is particularly stressed that the regular zone melting fails when impurities of $k$ above 1.0 are present. However, this property of these particular impurities may be turned to advantage in the process of zone cooling. This is performed in an outfit similar to the one used for the zone melting, but operated in a special manner. While the zone melting utilizes a moving molten zone with solid sections of the substance to be purified at both ends adjoining the zone, the zone cooling applies a moving solid zone with molten sections adjoining at both ends.

A complete removal of impurities of both kinds, that is those having $k$ less than 1.0 and those greater than 1.0, may include both one stage of zone melting and one stage of zone cooling. These two operations can be made one at a time on for example a straight bar. It is in most cases preferable to run a zone melting first and then a zone cooling. Between the two stages the one end piece of the bar with the concentrated impurities is cut off, and the remainder is then treated with zone cooling to remove the residual impurities.

The zone cooling process can be realized in several ways and Fig. 2 gives one typical example. Fig. 2 gives a top view through a horizontal plane of an apparatus for the zone cooling. It comprises a graphite boat 1, loaded with the substance 6, 7, 8 to be purified, set in a ceramic or quartz tube 2, heated by an external heater winding 4 surrounding the tube, the heater winding being split in two parts, which are separated by a short cooling winding also wound upon the tube. The heater winding connects to a generator 5, supplying the heating power. The cooling winding 3 has only a few turns and carries a coolant such as water or air at high speed. With properly adjusted input power to the heaters and corresponding balance between power and heat carried away by the cooling winding, the substance in the boat will under steady state conditions exhibit two liquid zones 6 and 8, separated by a short piece of solid substance 7. The tube may be evacuated or contain gas as conditions require. The boat is pulled slowly in either direction inside the tube. The connection from the generator to the heater may be moved as tappings on the outer end turns of the one half of the heater winding for adjustment of the geometrical length of the heater winding relative to the length of the molten substance inside. This serves to introduce a solidification at the proper moment at terminating the process starting from the outer end of the liquid section by decreasing the number of heater turns in circuit, while the input current is kept constant by external means. Each heater section has an axial length about that of the boat minus the length of the solid zone 7.

The zone cooling process is started by adjusting the position of boat inside the heating/cooling system until the boat ends are symmetrically placed relative to the cooling winding 3. The heater power and the cooling are adjusted to produce two liquid sections 6, 8, and the one short solid section 7. Then pulling is started and the boat is not stopped until the solid core 7 reaches the one end of the boat. Here the pulling direction is reversed and stopped when the solid core reaches the opposite end of the boat. At this point the movement is stopped and the pulling reversed again until the core touches the opposite end of the boat. At each pass a certain fraction of the impurities of $k$ over 1.0 accumulate in the solid core and hence the degree of purification will improve for each pass, which is also the case for each pass in the zone melting process.

Another way of performing the zone cooling, Fig. 3, is also to use a graphite boat 11 similar to that in Fig. 2, loaded with substance 16, 17, to be purified, cooling the one end 17 of the boat and heating all of the remainder by a winding 14, fed by generator 15. The heater winding is slightly wider than tube 12 and allows a short auxiliary coolant-carrying winding to be introduced inside the heater, creating a short solid core in the liquid phase 16 and moving it by sliding the auxiliary winding. The boat has a long liquid section 16 at the start of the process before the introduction of the auxiliary cooling 18, and a short solid section 17, cooled by the fixed cooling winding 13. The short core produced by cooling winding 18 is carried along the boat and delivered closely to the end core 17. Upon reaching it, the auxiliary coil is rapidly removed to the starting point again, the boat is rapidly moved forward a distance equal to the length of the solid zone 17, starting a complete fusion of this zone while the second zone is kept solid in state by the cooling winding 13. When zone 17 is completely fused, the boat is slowly pulled backwards again, transferring the second zone to the end position formerly taken by zone 17. This last step is a transfer of the impurities, collected during the travel of the second core, into a core at the end of the boat. The process may be repeated in any desirable number of passes to improve the degree of purification.

There is a maximum requirement on the pulling speed during each pass in zone cooling, set by the diffusion of impurities in the melt: the rate of pull must be low enough to allow almost complete diffusion in the melt. A similar condition also applies to zone melting. A definite upper limit to the speed of pulling in zone cooling cannot be set, since it depends upon the diffusion coefficients of the prevailing impurities at the temperature of the liquid substance.

When the required number of passes in the cooling stage are over, the cooling is terminated in a way which does not disperse the impurities outside the region occupied by the concentrated impurities. This is performed by starting a cooling cycle at the free, liquid-carrying end of the substance and gradually extending it along the whole liquid-carrying region up to the solid core in the opposite end by disconnecting heating turns 18 at the tapped end from the winding while the input current is kept constant.

A specific example of a process according to the invention will now be described. It is to be noted that the process according to the invention is not limited to the specific materials or conditions described in this example.

A solid rod of germanium had a length of 220 mm. and a rectangular cross section of 10×15 mm. The weight was 200 grams. An analysis of the germanium material of said rod showed impurities of antimony and arsenic and very small quantities of silicon. The resistivity of said rod varied between 0.2 and 10 ohm centimeters depending on where on the rod the resistivity was measured. A great value on the resistivity will indicate a pure material.

A graphite boat (as 1 in Fig. 2) was heated in a hydrogen atmosphere during half an hour at 1600° C. for removing impurities. The germanium rod was placed in this boat, which had the same inner dimensions as the rod. The germanium rod was then purified by a known zone melting process (see for instance Journal of Metals, July 1952) by means of melting a 30 mm. long zone across the rod with the aid of high frequency currents induced by a short coil surrounding a part of the rod. The molten zone was drawn six times back and forth through the length of the rod and the molten zone was then solidified by disconnecting the high frequency energy. The drawing speed was 4 millimeters per minute. The last solidified part and the adjacent parts of the rod were cut off so that the length of the rod became 150 mm. The resistivity of this 150 mm. long rod was measured to 20 ohmcentimeters at 20° C.

This rod was completely molten in a boat, prepared in the same manner as described above, the boat being placed in an arrangement according to Fig. 3. The boat had the same dimensions as before and thus the melt got a length of 220 mm. and a cross section which was narrower than the cross section of the original rod.

The flow of cooling agent to the cooling winding 16 was started with the winding in the right end position so that a 30 mm. long solid core 17 was formed to the right in the boat. The short cooling winding 18 was moved slowly along the boat at a speed of 4 millimeters per minute and the solid core followed the winding to the other end of the boat. The solid core was moved back and forth two times and it was thus placed at the right end of the boat. The boat was then displaced so much that the solid section was placed in the cooling winding 13 through which a cooling agent is flowing. The cooling winding 18 was then rapidly moved to the left end of the boat and a new solid core was formed and displaced along the melt to the first solid core 11 to the right of the boat with a speed of 4 millimeters per minute. Upon reaching the first core the cooling winding was again rapidly moved to the left side of the boat and the boat was rapidly moved to the right a distance corresponding to the length of the second core, whereby the second solid zone is kept solid while a complete fusion of the first solid zone is started. Three more solid cores were formed to the left of the boat and were similarly moved into contact with the preceding solid core located in the cooling winding 13. The whole melt was then cooled, beginning at the left end, by means of successively disconnecting the windings of the coil 14. The right end of the solid rod was cut off.

The resistivity of the rod varied between 35 and 65 ohmcentimeters at different points. The resistivity of the germanium was thus considerably increased from 20 to about 50 ohmcentimeters by the zone cooling method according to the invention, and the semi-conducting devices manufactured of this material showed considerably improved properties as compared with those devices containing germanium purified only by means of the known zone melting process.

I claim:

1. A method of removing soluble impurities having a distribution coefficient $k$ of more than 1.0 from a solid substance fusible by heat, comprising the steps of heating the substance including the impurities in an elongated mold to melting temperature, subjecting part of the melt to a transversely directed localized cooling zone while maintaining the remaining part of the melt at a temperature at which it is in the liquid phase to form a solid core bordered by liquid substance including impurities, displacing the localized cooling zone along the mold for sequentially solidifying and remelting parts of the substance including impurities thereby causing a solid core to move in unison with the displacement of said cooling zone area, and finally cooling the entire melt progressing from the end of the mold remote from the position of the core.

2. The method according to claim 1, wherein said localized cooling zone is displaced along the mold at a rate of speed at most equal to the diffusion speed of the impurities from the liquid phase into the solid phase.

3. The method according to claim 1, wherein said localized cooling zone is displaced along the mold to move said core to one end of the mold, a second transversely directed localized cooling zone is applied to the part of the substance including impurities in the liquid phase to form a second core spaced apart from the first core, the second localized cooling zone is displaced along the mold to move the second core through the melt into contact with the first one, the first cooling zone is discontinued to melt said first core, the second cooling zone is displaced to move the second core to the aforesaid end of the mold, and thereupon the heating of the mold is discontinued to effect solidification of the entire melt.

4. In the process of purifying a metal of impurities having a distribution coefficient $k$ greater than one, the steps of heating the metal including the impurities to melting temperature to form an elongated body of molten metal, subjecting a transverse section of the molten metal to a localized cooling means to solidify said transverse section while maintaining the remainder of the melt in the liquid phase and moving the cooling means along the molten metal at a rate such that molten metal adjacent the leading side of the solidified section is progressively solidified while supplying heat to the solid metal at the trailing side so that it melts at substantially the same rate that the metal at the leading side solidifies to in effect move said solidified transverse section along the elongated body of molten metal.

References Cited in the file of this patent

Kurzgefasstes Handbuch Aller Legierungen by Janecke Publ. in Heidelberg 1949, page 60 (Copy in Div. 3.)